(12) United States Patent
Tane et al.

(10) Patent No.: US 10,046,639 B2
(45) Date of Patent: Aug. 14, 2018

(54) DISPLAY APPARATUS

(71) Applicant: DENSO CORPORATION, Kariya, Aichi-pref. (JP)

(72) Inventors: Seigo Tane, Kariya (JP); Satoru Tamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/580,170

(22) PCT Filed: May 27, 2016

(86) PCT No.: PCT/JP2016/002578
§ 371 (c)(1),
(2) Date: Dec. 6, 2017

(87) PCT Pub. No.: WO2016/199367
PCT Pub. Date: Dec. 15, 2016

(65) Prior Publication Data
US 2018/0134159 A1    May 17, 2018

(30) Foreign Application Priority Data

Jun. 11, 2015 (JP) ................................. 2015-118594

(51) Int. Cl.
*B60K 35/00* (2006.01)
*H05B 33/08* (2006.01)

(52) U.S. Cl.
CPC ...... *B60K 35/00* (2013.01); *B60K 2350/1064* (2013.01); *B60K 2350/352* (2013.01); *H05B 33/0845* (2013.01); *H05B 33/0857* (2013.01)

(58) Field of Classification Search
None
See application file for complete search history.

(56) References Cited

U.S. PATENT DOCUMENTS 7,489,303 B1 *  2/2009  Pryor ..................... B60K 35/00
                                                        345/173
9,902,268 B2 *  2/2018  Nojiri .................... B60K 35/00
(Continued)

FOREIGN PATENT DOCUMENTS

JP          4438538 B2     3/2010
JP          5594525 B2     9/2014

*Primary Examiner* — Crystal L Hammond
(74) *Attorney, Agent, or Firm* — Harness, Dickey & Pierce, P.L.C.

(57) ABSTRACT

A display apparatus includes: a dial having a first surface, a second surface and an opening; a meter; a decorative part at a peripheral part of the meter; a display at a second surface side and displaying an image; and a controller controlling an image display state. An outermost area of the display overlaps with a part of the meter. The decorative part includes: a body member having a light-transmitting property; and a surface-treated layer having a light-transmitting property and a light-reflecting property. The controller switches the state of image display in the outermost area and a non-overlapping area. The decorative part is visually recognized due to the light-reflecting property of the surface-treated layer when the image is in the non-overlapping area. The image is visually recognized in an overlapping part of the decorative part due to the light-transmitting property when the image is in the outermost area.

6 Claims, 5 Drawing Sheets

(56) References Cited

U.S. PATENT DOCUMENTS

| | | | | |
|---|---|---|---|---|
| 2002/0183921 | A1* | 12/2002 | Sugiyama | B60K 37/02 359/631 |
| 2006/0185576 | A1* | 8/2006 | Tane | G01D 11/28 116/288 |
| 2007/0088501 | A1* | 4/2007 | Kato | G01C 21/26 701/425 |
| 2007/0115107 | A1* | 5/2007 | Kageyama | B60K 37/02 340/461 |
| 2007/0279243 | A1* | 12/2007 | Araki | G01D 7/002 340/815.58 |
| 2010/0277696 | A1* | 11/2010 | Huebner | B60K 35/00 352/81 |
| 2012/0170130 | A1* | 7/2012 | Sasaki | B60K 35/00 359/630 |
| 2013/0186324 | A1* | 7/2013 | Kato | G01D 13/02 116/28 R |
| 2013/0188260 | A1* | 7/2013 | Matsushita | B60K 35/00 359/632 |
| 2014/0368540 | A1* | 12/2014 | Iguchi | G06K 9/00832 345/633 |
| 2014/0368544 | A1* | 12/2014 | Kobayashi | G02B 27/0101 345/633 |
| 2015/0103408 | A1* | 4/2015 | Nishima | B60K 35/00 359/618 |
| 2015/0379776 | A1* | 12/2015 | Ito | G01D 7/04 345/419 |
| 2016/0131912 | A1* | 5/2016 | Border | G02B 27/0176 345/8 |
| 2016/0288705 | A1* | 10/2016 | Henon | G02B 27/01 |
| 2017/0059771 | A1* | 3/2017 | Yuki | G02F 1/133615 |
| 2017/0242247 | A1* | 8/2017 | Tso | G02B 27/0101 |

* cited by examiner

DISPLAY APPARATUS

CROSS REFERENCE TO RELATED APPLICATIONS

This application is a U.S. National Phase Application under 35 U.S.C. 371 of International Application No. PCT/JP2016/002578 filed on May 27, 2016 and published in Japanese as WO 2016/199367 A1 on Dec. 15, 2016. This application is based on and claims the benefit of priority from Japanese Patent Application No. 2015-118594 filed on Jun. 11, 2015. The entire disclosures of all of the above applications are incorporated herein by reference.

TECHNICAL FIELD

The present disclosure relates to a display apparatus suitable for application to a vehicle display apparatus that displays information related to a vehicle.

BACKGROUND ART

A display apparatus described in Patent Literature 1 is known as an example of a conventional display apparatus. The display apparatus (a vehicle meter unit) of Patent Literature 1 includes a first meter of a pointer type, a second meter of a pointer type, and a liquid crystal display formed of a TFT liquid crystal panel. A light-transmitting meter frame is provided for decoration on the periphery of each of the first meter and the second meter. Information displayed on the second meter is partly switched when a meter LED disposed inside the meter is turned on or off.

The liquid crystal display is disposed between the first meter and the second meter so as to overlap with a part of a meter area of each of the first and second meters. The meter frame of each of the first meter and the second meter is thus erased in the area overlapping with the liquid crystal display. The meter frame is illuminated by a frame LED disposed inside the meter frame. A luminescent color of the frame LED is switched by adjusting the amount of light for each of RGB.

The display apparatus of Patent Literature 1 is adapted to switch a part of information displayed on the second meter and information displayed on the liquid crystal display depending on a travel mode. The luminescent color of the meter frame is also switched depending on the travel mode.

However, the display apparatus of Patent Literature 1 simply switches the information displayed on the liquid crystal display with the size of the display area on the liquid crystal display remaining the same. The meter frame is partly cut off in the circumferential direction and merely changed in the luminescent color as the information displayed on the liquid crystal display is switched depending on a traveling state.

PRIOR ART LITERATURES

Patent Literature

Patent Literature 1: JP 5594525 B2

SUMMARY OF INVENTION

It is an object of the present disclosure to provide a display apparatus that can switch the size of a display area on a display and at the same time vary the appearance of a decorative part as the display area is switched.

A display apparatus includes: a dial that has a first surface being a visual recognition side, a second surface being a side opposite to the first surface, and an opening; a meter of an analog type that is arranged at a first surface side of the dial; a decorative part for decoration that is arranged at a peripheral part of the meter; a display that is arranged at a second surface side of the dial and displays an image through the opening; and a controller that controls a state of image display on the display. In the display apparatus, an outermost area of the display is arranged to overlap with a part of the meter, which includes the decorative part, in a projection from the first surface side. The decorative part includes a body member that has a light-transmitting property, and a surface-treated layer that is arranged on a surface of the body member, and has both of a light-transmitting property and a light-reflecting property. The controller switches the state of image display on the display at the outermost area and the state of image display on the display a non-overlapping area, which does not overlap with the meter including the decorative part. The decorative part is visually recognized entirely due to the light-reflecting property of the surface-treated layer when the image is displayed in the non-overlapping area. The image on the display is visually recognized in an overlapping part of the decorative part overlapping with the outermost area due to the light-transmitting property of the surface-treated layer when the image is displayed in the outermost area.

According to the display apparatus described above, display on the display can be switched between the non-overlapping area and the outermost area to be able to switch the size of the display area on the display.

At the time of display in the non-overlapping area on the display, the entire shape of the decorative part is visual recognized due to the light-reflecting property of the surface-treated layer. At the time of display in the outermost area on the display, the decorative part is visual recognized as if a part of the decorative part does not exist since the image on the display is visual recognized due to the light-transmitting property of the surface-treated layer. The appearance of the decorative part can thus be varied as the size of the display area on the display is switched.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

A plurality of embodiments for carrying out the present disclosure will now be described with reference to the drawings. In each embodiment, a part corresponding to a matter described in a preceding embodiment will be assigned a reference numeral identical to that assigned in the preceding embodiment to omit a redundant description in some cases. When only a part of the configuration is described in each embodiment, the description made in a preceding embodiment can be applied to the other parts of the configuration. In addition to a combination of parts specified as combinable in the embodiments, the embodiments can be partly combined in an unspecified manner as long as such combination does not particularly cause a problem.

First Embodiment

Figure 1:
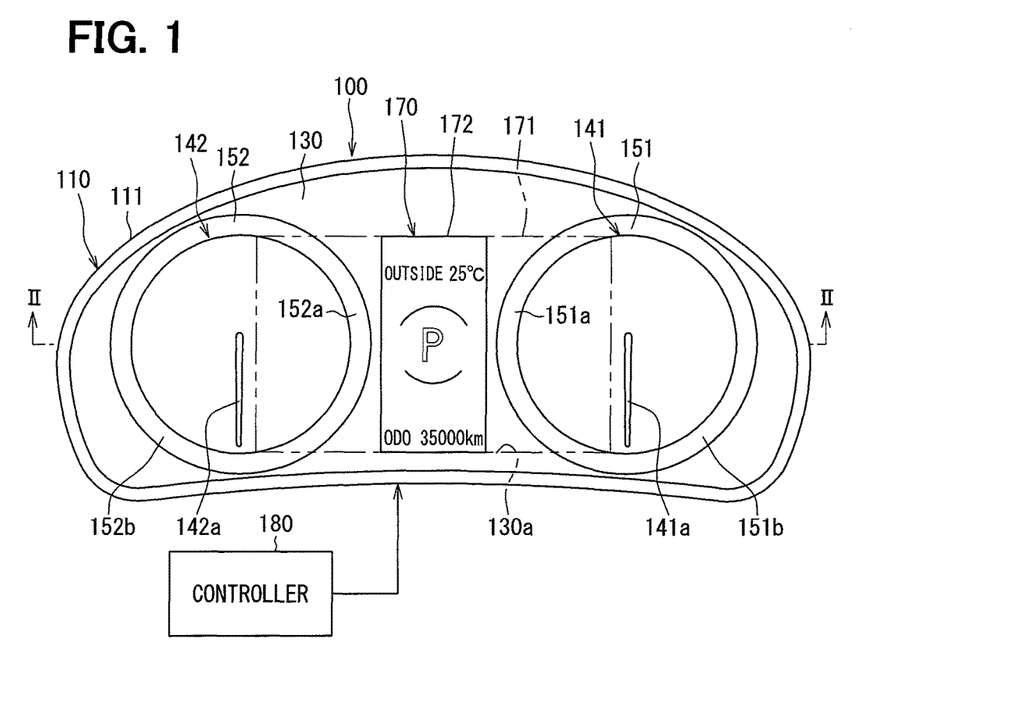
FIG. 1 is a front view illustrating a vehicle display apparatus according to a first embodiment (display in a non-overlapping area)
Figure 2:
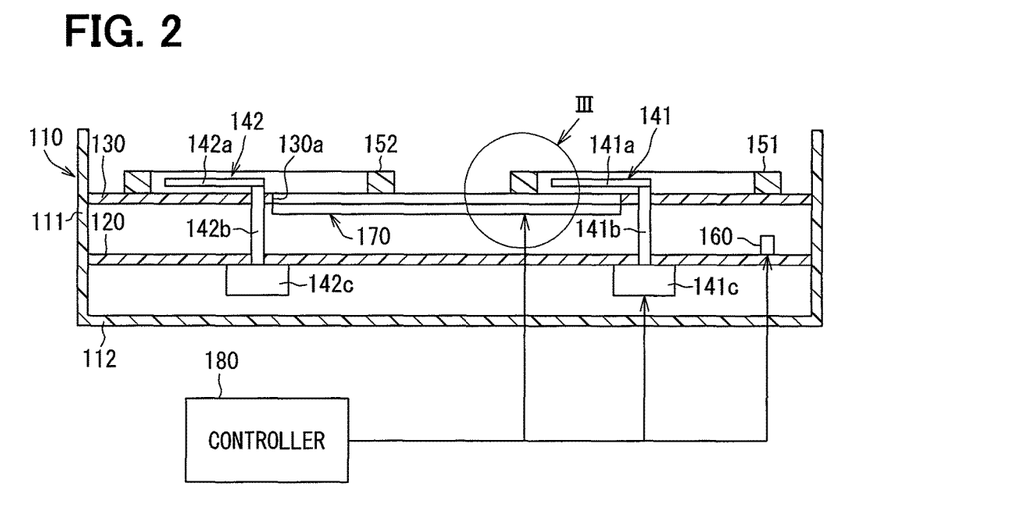
FIG. 2 is a cross-sectional view taken along a line II-II of FIG. 1.

A first embodiment of the present disclosure will be described with reference to FIGS. 1 to 6. A display apparatus according to the first embodiment is applied to a vehicle display apparatus 100. As illustrated in FIG. 1, the vehicle display apparatus 100 displays predetermined information related to a vehicle to a user (viewer). The vehicle display apparatus 100 is provided on a surface of a vehicle instrument panel (hereinafter, referred to as an instrument panel) facing a user and includes a case 110, a substrate 120, a dial 130, meters 141 and 142, decorative parts 151 and 152, a light source 160, a display 170, a controller 180, and the like.

The case 110 has, for example, an oblong elliptical front shape and is a resin container forming a bottomed cylinder, where an opening thereof faces a user (a viewing side) and a bottom thereof faces a side opposite to a user. The side opposite to a user will be hereinafter referred to as an opposite-user side (opposite-viewing side). A peripheral wall 111 is formed on the periphery of the case 110, and a bottom 112 is formed at the bottom of the case 110.

The substrate 120 is, for example, made of a glass epoxy substrate or the like and forms an electrical circuit unit of the vehicle display apparatus 100. The substrate 120 has an oblong elliptical shape and is disposed at a middle position of the case 110 in an axial direction to be fixed to an inner peripheral surface of the peripheral wall 111, for example. The substrate 120 is provided with motors 141c and 142c, the light source 160, and the like to be described.

The dial 130 is an oblong elliptical thin plate member made of a light-transmitting material (such as a transparent polycarbonate resin), for example, and is disposed on the side of a user relative to the substrate 120 to be fixed to the inner peripheral surface of the peripheral wall 111. Left and right areas of the dial 130 are areas in which the meters 141 and 142 having circular shapes (to be described) are disposed, and a central area of the dial 130 is an area in which the display 170 having an oblong square shape (to be described) is disposed. The area of the dial 130 in which the display 170 is disposed is provided with an opening 130a having the size corresponding to the outer shape of the display 170.

Figure 5:
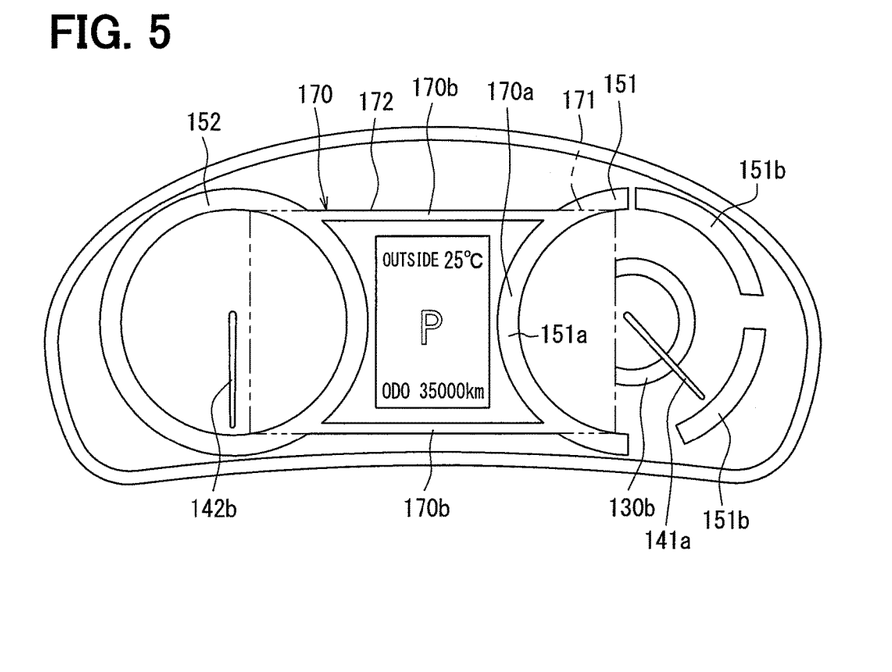
FIG. 5 is a front view illustrating the case of color change display of the decorative part.

Scales and numbers that are light transmissive and indicate a vehicle speed and an engine speed are formed in areas corresponding to the peripheries of the meters 141 and 142 on the dial 130 excluding the opening 130a. The numbers on the meter 141 indicate a high speed range of vehicle speed values. The numbers on the meter 142 indicate a low speed range of engine speed values. A ring 130b which is light transmissive and a circumferential part of which is cut off is formed in an area corresponding to the center of the meter 141 (FIG. 5).

Light-shielding print coating (such as black coating) is applied to a surface on the user side (a first surface side) and a surface on the opposite-user side (a second surface side) of areas on the dial 130 excluding the scales, the numbers, and the ring 130b. That is, the scales, the numbers, and the ring 130b are parts that are not subjected to the light-shielding print coating and thus maintain light-transmitting property. The scales, the numbers, and the ring 130b are illuminated when a light source not shown is turned on by the controller 180 to be described.

The meter 141 is an analog, circular meter displaying a vehicle speed, for example, and is provided in the right area of the dial 130 on the user side thereof. Likewise, the meter 142 is an analog, circular meter displaying an engine speed, for example, and is provided in the left area of the dial 130 on the user side thereof. The meter 141 includes a pointer 141a, a turning shaft 141b, the motor 141c, and the like. Likewise, the meter 142 includes a pointer 142a, a turning shaft 142b, the motor 142c, and the like.

The pointers 141a and 142a are each formed of a light-transmitting material (such as a transparent polycarbonate resin or a transparent acrylic resin), and are disposed on the user side of the dial 130. The turning shafts 141b and 142b extending in a direction orthogonal to the pointers 141a and 142a are provided at one ends of the pointers, and are connected to shafts of the motors 141c and 142c while passing through the dial 130 and the substrate 120.

The motors 141c and 142c are pointer driving units for turning the pointers 141a and 142a and are disposed on the surface of the substrate 120 on the opposite-user side. A stepper motor serving as a synchronous motor that operates in synchronization with pulse power is used for each of the motors 141c and 142c, for example. Actuation of the motors 141c and 142c is controlled by the controller 180 to be described.

The decorative parts 151 and 152 are members used for decoration and are provided on the peripheries of the meters 141 and 142 on the surface of the dial 130 on the user side to make the meters 141 and 142 appear three-dimensional to a user and at the same time improve the appearance of the circumferential sides of the meters 141 and 142. Each of the decorative parts 151 and 152 has a ring shape and is formed of a body member 1511 made of a light-transmitting resin material and a surface-treated layer 1512 provided on the surface of the body member.

The display 170 to be described and the meters 141 and 142 including the decorative parts 151 and 152 are in a positional relationship in which the display 170 (the outer shape) overlaps with parts of the meters 141 and 142 including the decorative parts 151 and 152 when projected and viewed from the user side. The parts of the decorative parts 151 and 152 overlapping with the display 170 are overlapping parts 151a and 152a, and parts not overlapping with the display are non-overlapping parts 151b and 152b.

Figure 3:
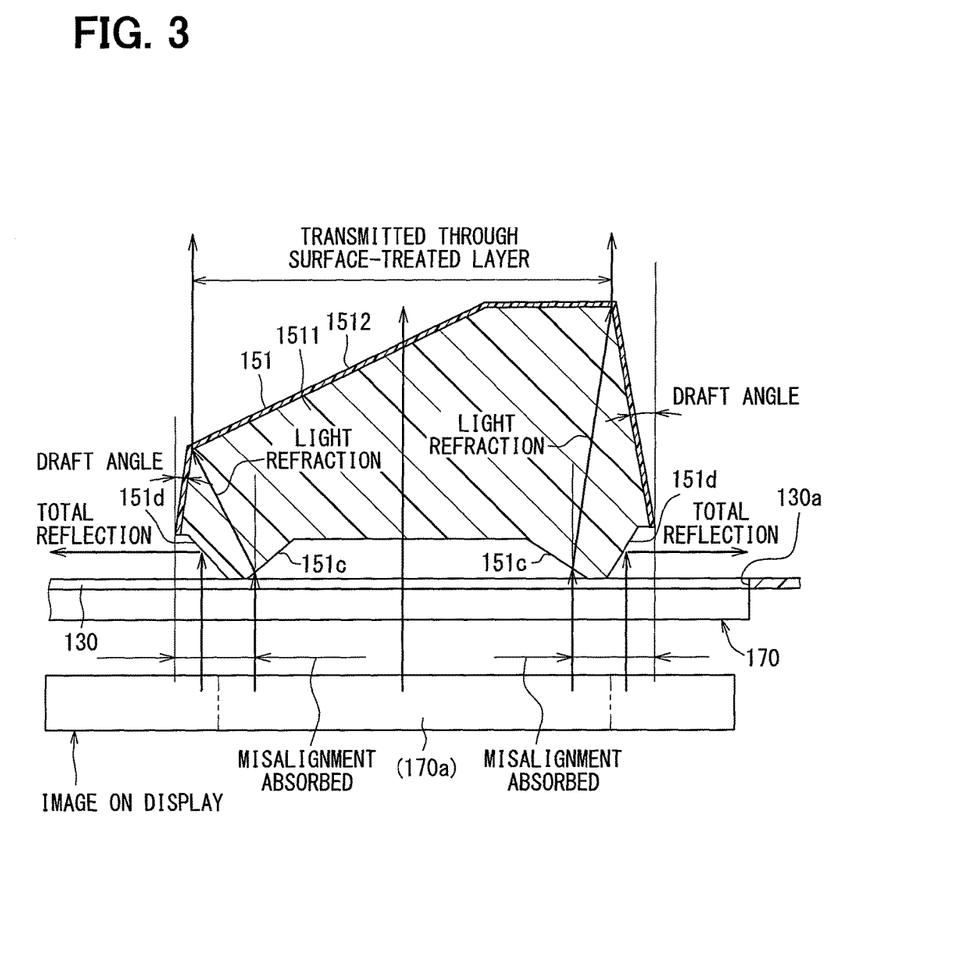
FIG. 3 is an enlarged cross-sectional view illustrating a part III (a decorative part) of FIG. 2.

The body member 1511 has a ring shape as a whole when viewed from the user side, and is formed by die molding a resin material. The body member 1511 has a trapezoidal cross-sectional shape as illustrated in FIG. 3, where a side surface on the inner circumferential side and a side surface on the outer circumferential side are each provided with a minimum slope corresponding to a mold draft required for mold release after die molding.

A recess is formed in the body member 1511 on the side facing the dial 130, and a refractive part 151c is provided on each of both edges of the recess in a direction (width direction) intersecting with a circumferential direction of the body member 1511. The refractive part 151c is formed of a surface tilted with respect to the surface of the dial 130 and refracts an image (light) from the display 170 to spread the light into an area in the width direction of the body member 1511.

A reflective part 151d is provided on each of both edges of the body member 1511 in the width direction on the side facing the dial 130. The reflective part 151d is formed of a surface tilted with respect to the surface of the dial 130 like a chamfer and reflects (totally reflects) an image (light) from the display 170 in a direction along the surface of the dial 130 (toward the inner diameter and outer diameter of the body member 1511).

The surface-treated layer 1512 is a treated layer provided on the surface of the body member 1511 by coating, vapor deposition, plating, or the like of a metallic color. The surface-treated layer 1512 is a treated layer having both a light-transmitting property allowing light from the display 170 to be transmitted and light-reflecting property allowing light from the outside to be reflected.

A plurality of the light sources 160 is provided on the surface of the substrate 120 on the user side while corresponding to the circumferential direction of the non-overlapping parts 151b and 152b, and illuminates the non-overlapping parts 151b and 152b of the decorative parts 151 and 152. Each of the plurality of the light sources 160 is formed of a light-emitting diode of red, green, and blue colors, for example, and illuminates in various colors by adjusting an output ratio of each diode at the time of illumination.

The non-overlapping part 151b has split luminous areas, for example, so that the non-overlapping part 151b can be illuminated in a split manner (FIG. 5) by turning on the light source 160 corresponding to a predetermined area among the plurality of the light sources 160.

The light source 160 is controlled by the controller 180 (to be described) to be turned on/off and adjusted in the luminescent color. In addition to the light source 160, a plurality of light sources (not shown) is provided on the substrate 120 to illuminate the scales, the numbers, and the pointers 141a and 142a on the meters 141 and 142.

The display 170 is a flat panel display that displays (displays images of) various vehicle information images, the decoration correspondent image 170a corresponding to the overlapping part 151a, an ornamental image 170b, and the like as digital images. A thin film transistor (TFT) liquid crystal display using a thin film transistor is employed as the display 170, for example. A display state (display content) of the display 170 is controlled by the controller 180 to be described.

The display 170 has an oblong square outer shape (hereinafter referred to as an outermost area 171) as viewed from the user side, and is disposed between the meter 141 and the meter 142 to be fixed to the surface of the dial 130 on the opposite-user side. A display surface (display image) of the display 170 can be visual recognized through the opening 130a of the dial 130.

The display 170 is disposed such that, when projected and viewed from the user side, the outermost area 171 overlaps with a part of the meters 141 and 142 including the decorative parts 151 and 152. A non-overlapping area 172 of the display 170 is an area between the meter 141 and the meter 142 and not overlapping with the meters 141 and 142 including the decorative parts 151 and 152.

Display on the display 170 can be switched between an image using the outermost area 171 and an image using the non-overlapping area 172. Various images on the display 170 are displayed in a predetermined color on a black background, for example.

Figure 4:
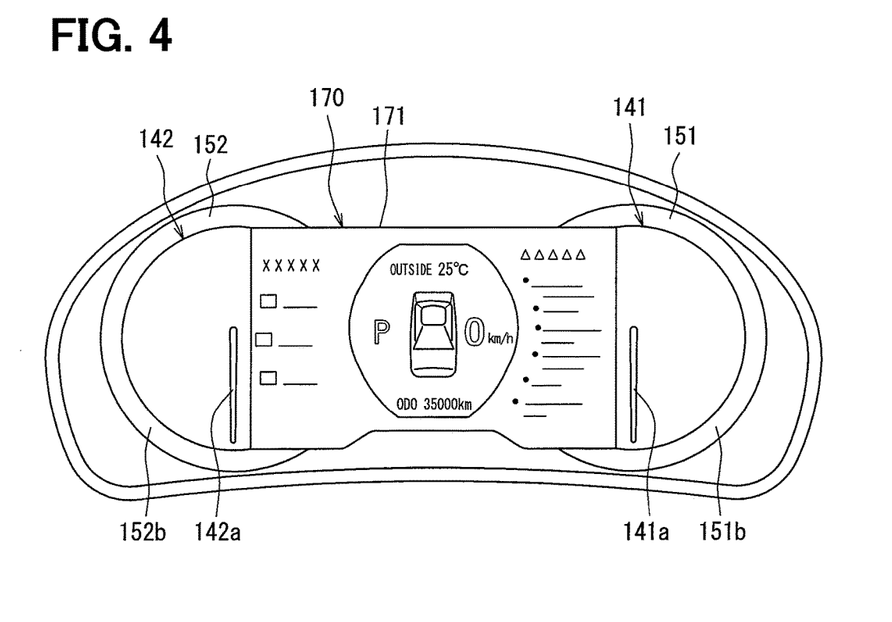
FIG. 4 is a front view illustrating the case of display in an outermost area of a display.

An image of a first pattern using the outermost area 171 displays an outside air temperature information image, a gearshift position information image, a vehicle speed information image, a travel distance information image, and the like in the center of the area and displays another vehicle information image, a music information image of audio equipment, and the like in left and right areas as illustrated in FIG. 4, for example.

Figure 6:
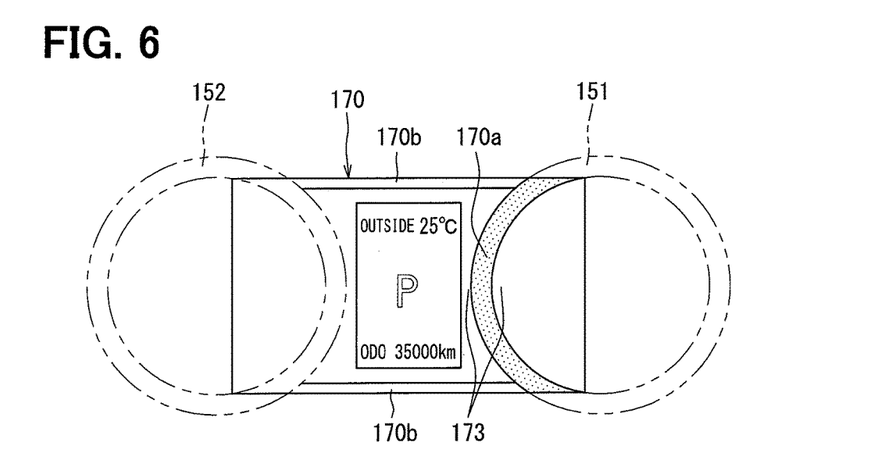
FIG. 6 is a front view illustrating a decoration correspondent image on the display.

An image of a second pattern using the outermost area 171 displays the outside air temperature information image, the gearshift position information image, the travel distance information image, and the like in the center of the area and displays the decoration correspondent image 170a having an arc shape formed at a position corresponding to the overlapping part 151a of the decorative part 151 and the ornamental image 170b connecting the decorative parts 151 and 152 at upper and lower positions as illustrated in FIGS. 5 and 6, for example. A semicircular area of the display 170 overlapping with the meter 141 displays a scale image indicating the vehicle speed and a numerical image indicating the low speed range of the vehicle speed values. A semicircular area of the display 170 overlapping with the meter 142 displays a scale image indicating the engine speed and a numerical image indicating the high speed range of the engine speed values.

An image using the non-overlapping area 172 displays the outside air temperature information image, the gearshift position information image, the travel distance information image, and the like as illustrated in FIG. 1. A semicircular area of the display 170 overlapping with the meter 141 displays a scale image indicating the vehicle speed and a numerical image indicating the low speed range of the vehicle speed values. A semicircular area of the display 170 overlapping with the meter 142 displays a scale image indicating the engine speed and a numerical image indicating the high speed range of the engine speed values.

The controller 180 controls driving of the motors 141c and 142c, turning on/off of the light source 160, switching of the luminescent color, and image formation and image switching of the display 170. The controller 180 performs image switching on the basis of an input state of an image selector switch operated by a user and performs various displays according to a switched image.

The configuration of the vehicle display apparatus 100 according to the present embodiment has been described, and now the operation of the vehicle display apparatus 100 will be described.

1. Display in non-overlapping area (FIG. 1)

When a user operates the image selector switch and makes a request for display in the non-overlapping area 172, the controller 180 turns off the light source 160 and switches the display on the display 170 to the display in the non-overlapping area 172. The controller 180 performs control such that the scales and the numbers formed on the dial 130 are illuminated on the meters 141 and 142 and that the scale image and the numerical image are formed in an inner area corresponding to the meters 141 and 142 on the display 170, whereby the scales and the numbers indicating the vehicle speed and the engine speed are displayed across the entire area.

The controller 180 then drives the motor 141c on the basis of a speed signal from a vehicle speed sensor not shown.

This causes the pointer 141a to turn about the center of the meter 141 and a tip of the pointer 141a to indicate the speed (km/h) by pointing at a number and a scale corresponding to the speed signal.

The controller 180 also drives the motor 142c on the basis of an engine speed signal from an engine speed sensor not shown. This causes the pointer 142a to turn about the center of the meter 142 and a tip of the pointer 142a to indicate the engine speed (rpm) by pointing at a number and a scale corresponding to the engine speed signal.

The non-overlapping area 172 on the display 170 displays the outside air temperature information image, the gearshift position information image, the travel distance information image, and the like.

At this time, light from the outside is reflected toward the user by a light-reflecting property of the surface-treated layer 1512 of the decorative parts 151 and 152. The entire shapes of the decorative parts 151 and 152 are thus visual recognized as having a metallic color.

2. Display in outermost area (first pattern, FIG. 4)

When a user operates the image selector switch and makes a request for displaying the first pattern in the outermost area 171, the controller 180 turns off the light source 160 and switches the display on the display 170 to the display of the first pattern in the outermost area 171.

The controller 180 then stops driving of the motor 141c. This stops turning of the pointer 141a. The controller 180 drives the motor 142c on the basis of an engine speed signal from the engine speed sensor not shown. This causes the pointer 142a to turn about the center of the meter 142 and a tip of the pointer 142a to indicate the engine speed (rpm) by pointing at a number and a scale corresponding to the engine speed signal.

The display 170 displays the outside air temperature information image, the gearshift position information image, the vehicle speed information image, the travel distance information image, and the like in the center of the display and displays another vehicle information image, the music information image of audio equipment, and the like in the left and right areas of the display. In forming the vehicle speed information image, the controller 180 determines the vehicle speed on the basis of the speed signal from the vehicle speed sensor not shown and forms an image corresponding to the vehicle speed.

At this time, the image in the outermost area 171 is visual recognized in the areas corresponding to the overlapping parts 151a and 152a of the decorative parts 151 and 152 since the image (light) in the outermost area 171 is transmitted by the light-transmitting property of the surface-treated layer 1512. The non-overlapping parts 151b and 152b are visual recognized as having a metallic color since light from the outside is reflected toward the user by the light-reflecting property of the surface-treated layer 1512 in the areas corresponding to the non-overlapping parts 151b and 152b of the decorative parts 151 and 152. As a result, the display apparatus is visual recognized as if a part (the overlapping parts 151a and 152a) of the decorative parts 151 and 152 does not exist.

3. Display in outermost area (second pattern, FIGS. 5 and 6)

When a user operates the image selector switch and makes a request for displaying the second pattern in the outermost area 171, the controller 180 partly turns on the plurality of the light sources 160 (blue or green), turns on the light source for the ring 130b, and switches the display on the display 170 to the display of the second pattern in the outermost area 171.

In this case, the light from the light source 160 is visual recognized in the non-overlapping part 151b of the decorative part 151 due to the light-transmitting property of the surface-treated layer 1512. That is, the non-overlapping part 151b is illuminated in blue or green as an indicator indicating an eco-driving state of the vehicle, for example. The ring 130b is illuminated as well. The controller 180 then drives the motor 141c. In this case, the pointer 141a is turned as a pointer indicating the eco-driving state of the vehicle in the range of the non-overlapping part 151b. The controller 180 varies the luminescent color of the light source 160 from blue to green as the level of the eco-driving state gets higher.

The image (light) of the decoration correspondent image 170a on the display 170 is transmitted and visual recognized in the overlapping part 151a of the decorative part 151 due to the light-transmitting property of the surface-treated layer 1512. That is, a part (the overlapping part 151a) of the decorative part 151 is illuminated in red and visual recognized. A semicircular area of the display 170 overlapping with the meter 141 displays a scale image indicating the vehicle speed, a numerical image indicating the low speed range of the vehicle speed values, and a pointer image representing an analog pointer to display the vehicle speed along with the overlapping part 151a illuminated in red.

The controller 180 drives the motor 142c on the basis of an engine speed signal from the engine speed sensor not shown. This causes the pointer 142a to turn about the center of the meter 142 and a tip of the pointer 142a to indicate the engine speed (rpm) by pointing at a number and a scale corresponding to the engine speed signal. The decorative part 152 is visual recognized as having a metallic color since light from the outside is reflected all around the decorative part due to the light-reflecting property of the surface-treated layer 1512.

The non-overlapping area 172 on the display 170 displays the outside air temperature information image, the gearshift position information image, the travel distance information image, the ornamental image 170b, and the like.

As described above, the present embodiment can switch the display between the non-overlapping area 172 of the display 170 and the outermost area 171 to be able to switch the size of the display area on the display 170.

At the time of display in the non-overlapping area 172 on the display 170, the entire shapes of the decorative parts 151 and 152 are visual recognized due to the light-reflecting property of the surface-treated layer 1512.

At the time of display in the outermost area 171 on the display 170, the decorative parts 151 and 152 are visual recognized as if a part of the decorative parts 151 and 152 does not exist since the display on the display 170 is visual recognized due to the light-transmitting property of the surface-treated layer 1512. The appearance of the decorative parts 151 and 152 can thus be varied as the size of the display area on the display 170 is switched.

At the time of displaying the second pattern in the outermost area 171, the image of the display 170 visual recognized in the overlapping part 151a is the decoration correspondent image 170a formed by the controller 180 so as to correspond to the overlapping part 151a. The overlapping part 151a of the decorative part 151 can thus be illuminated in a color of the decoration correspondent image 170a.

The light source 160 is provided to illuminate the non-overlapping part 151b of the decorative part 151 in a color different from that of the decoration correspondent image 170a from the backside of the dial 130, where turning on/off of the light source 160 is controlled by the controller 180. As a result, the non-overlapping part 151b of the decorative part 151 can be illuminated in a color different from that of the overlapping part 151a by the light source 160.

The decorative part 151 is also provided with the refractive part 151c that refracts light of the image on the display 170 and spreads the light in the area of the decorative part 151 along the width direction intersecting with the circumferential direction, and the reflective part 151d that reflects light of the image on the display 170 in the direction along the surface of the dial 130 at the edge of the decorative part 151 in its width direction.

As a result, the image on the display 170 or the light of the decoration correspondent image 170a is seen across the decorative parts 151 and 152 in the width direction by the refractive part 151c. The image on the display 170 or the light of the decoration correspondent image 170a on the edges of the decorative parts 151 and 152 in the width direction is reflected in the direction along the surface of the dial 130 by the reflective part 151d and not visual recognized from the user side.

When an image is visual recognized on the edges of the decorative parts 151 and 152 in the width direction, a distortion is generated between the image on the edges in the width direction and an image visual recognized in the entire decorative parts 151 and 152 in the width direction. The distortion is eliminated by making the image on the edges in the width direction of the decorative parts 151 and 152 invisible, whereby seamlessness of the image visual recognized in the decorative parts 151 and 152 can be enhanced.

A misalignment between the decoration correspondent image 170a and the decorative parts 151 and 152 can be absorbed when the decoration correspondent image 170a is provided on the display 170.

Second Embodiment

Figure 7:
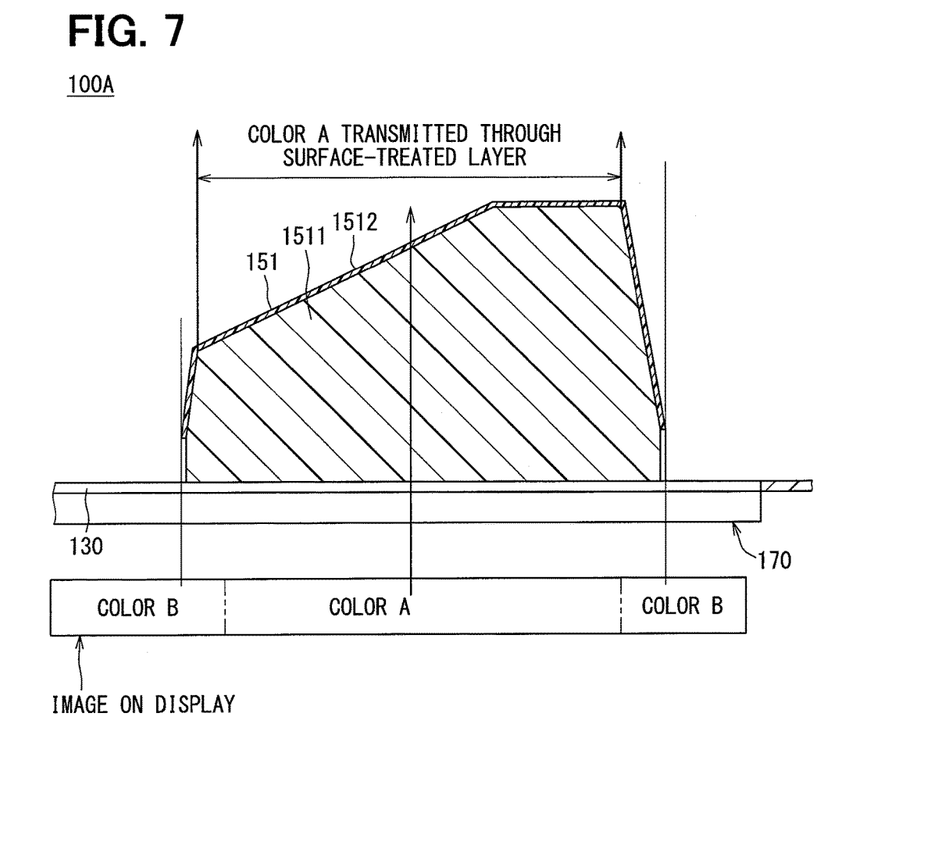
FIG. 7 is a cross-sectional view illustrating a decorative part according to a second embodiment.

FIG. 7 illustrates a vehicle display apparatus 100A according to a second embodiment. The vehicle display apparatus 100A of the second embodiment is implemented by modifying a part of the shape of the decorative part 151 and the way an image is formed on the display 170 in the vehicle display apparatus 100 of the first embodiment.

The refractive part 151c and the reflective part 151d are not provided in the decorative part 151 so that an image (a color A area) on the display 170 is transmitted to the side of a user. The controller 180 adjusts a color and brightness of the image on the display 170 as follows.

That is, the area (the color A area) corresponding to the decorative part 151 and an area (a color B area) corresponding to a boundary of the decorative part 151 in the width direction are assumed in the image on the display 170. The controller 180 makes an adjustment such that the color and brightness of the area (color B) corresponding to the boundary with the decorative part 151 in the image on the display 170 match the color and brightness of light (color A) visual recognized after the image on the display 170 is transmitted through the decorative part 151.

As a result, the color and brightness of the area corresponding to the boundary with the decorative part 151 in the image on the display 170 can be made similar to the color and brightness of the light transmitted through the decorative part 151. This makes a distortion of the image at the boundary with the decorative part 151 less visible to be able to enhance the seamlessness of the image visual recognized in the decorative part 151.

A misalignment between a decoration correspondent image 170a and the decorative part 151 can be absorbed when the decoration correspondent image 170a is provided on the display 170.

Third Embodiment

Figure 8:
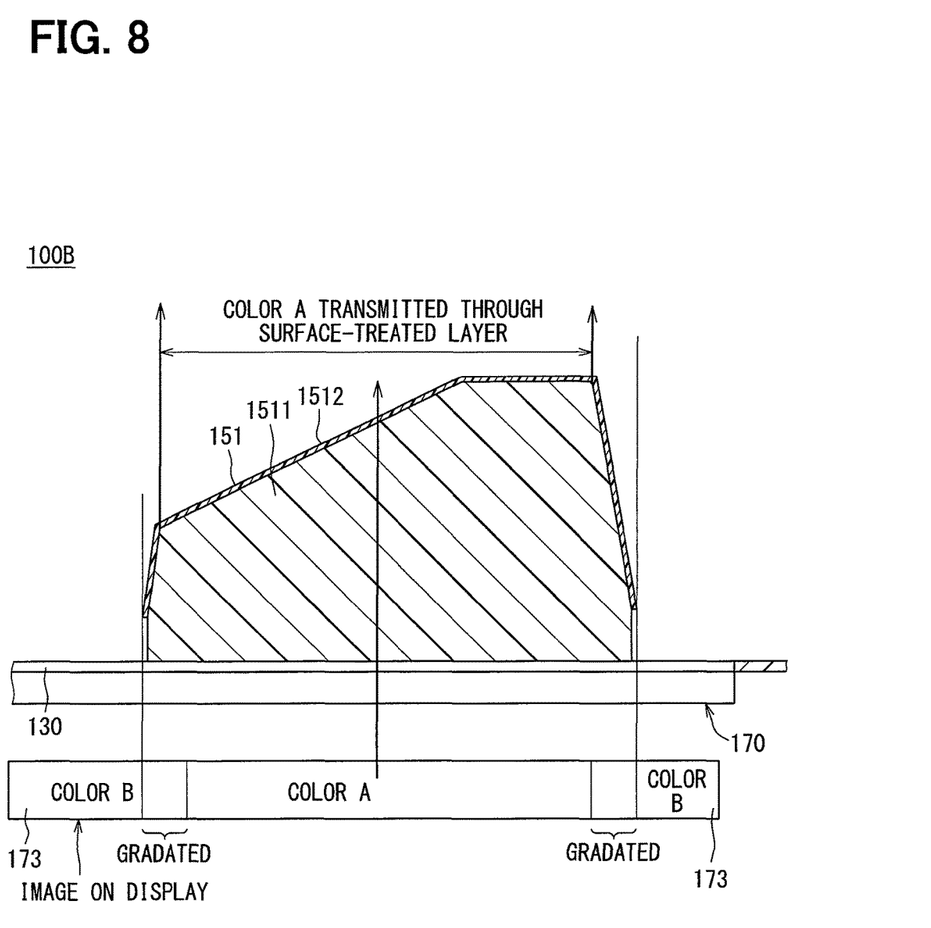
FIG. 8 is a cross-sectional view illustrating a decorative part according to a third embodiment.

FIG. 8 illustrates a vehicle display apparatus 1008 according to a third embodiment. The vehicle display apparatus 1008 of the third embodiment is implemented by modifying a part of the shape of the decorative part 151 and the way an image is formed on the display 170 in the vehicle display apparatus 100 of the first embodiment.

As with the second embodiment, the refractive part 151c and the reflective part 151d are not provided in the decorative part 151 so that an image (a color A area) on the display 170 is transmitted to the side of a user. The controller 180 adjusts a color and brightness of the image on the display 170 as follows.

That is, an area corresponding to the decorative part 151 and an area corresponding to a boundary of the decorative part 151 in the width direction are assumed in the image on the display 170. An area of the display 170 in which the decorative part 151 is not formed, namely an area in which the decorative part 151 does not overlap with the display 170 is defined as an unformed area 173.

The controller 180 makes an adjustment such that a color and brightness of an area corresponding to the boundary with the decorative part 151 in the image on the display 170 is gradated from the color and brightness (color A) of the area corresponding to the decorative part 151 to a color and brightness (color B) of the area corresponding to the unformed area 173.

As a result, the color and brightness of the image on the display 170 can be changed smoothly between the decorative part 151 and the unformed area 173 to be able to make a distortion of the image at the boundary of the decorative part 151 less visible and enhance the seamlessness of the image visual recognized in the decorative part 151.

A misalignment between a decoration correspondent image 170a and the decorative part 151 can be absorbed when the decoration correspondent image 170a is provided on the display 170.

Other Embodiments

The decoration correspondent image 170a on the display 170 and the light source 160 illuminating the non-overlapping part 151b of the decorative part 151 are provided in the first embodiment but may be removed so that the display may be switched between the non-overlapping area 172 (FIG. 1) and the outermost area 171 (display of the first pattern, FIG. 4). Alternatively, only one of the decoration correspondent image 170a and the light source 160 illuminating the non-overlapping part 151b of the decorative part 151 may be included.

Although two (a plurality) of the meters 141 and 142 are provided, only one of the meters may be provided instead.

In each of the above-described embodiments, the present disclosure is applied to the meters 141 and 142 displaying the vehicle speed and the engine speed in the vehicle display apparatus but can also be widely applied to ones displaying another information (such as the amount of fuel remaining and an engine water temperature).

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display apparatus comprising:
   a dial that has
      a first surface being a visual recognition side,
      a second surface being a side opposite to the first surface, and
      an opening;
   a meter of an analog type that is arranged at a first surface side of the dial;
   a decorative part for decoration that is arranged at a peripheral part of the meter;
   a display that is arranged at a second surface side of the dial and displays an image through the opening; and
   a controller that controls a state of image display on the display, wherein:
   an outermost area of the display is arranged to overlap with a part of the meter, which includes the decorative part, in a projection from the first surface side;
   the decorative part includes
      a body member that has a light-transmitting property, and
      a surface-treated layer that is arranged on a surface of the body member, and has both of a light-transmitting property and a light-reflecting property;
   the controller switches the state of the image display on the display at the outermost area, and switches the state of the image display on the display at a non-overlapping area, which does not overlap with the meter including the decorative part;
   the decorative part is visually recognized entirely due to the light-reflecting property of the surface-treated layer when the image is displayed in the non-overlapping area; and
   the image on the display is visually recognized in an overlapping part of the decorative part overlapping with the outermost area due to the light-transmitting property of the surface-treated layer when the image is displayed in the outermost area.

2. The display apparatus according to claim 1, wherein the image on the display visually recognized in the overlapping part is a decoration correspondent image, which is provided by the controller, to correspond to the overlapping part.

3. The display apparatus according to claim 2, further comprising:
   a light source that illuminates a non-overlapping part of the decorative part, which does not overlap with the outermost area, in a color different from the decoration correspondent image from the second surface side,
   wherein the controller controls illumination of the light source.

4. The display apparatus according to claim 1, wherein the decorative part includes:
   a refractive part that refracts light of the image on the display such that the light spreads in an area of the decorative part in a width direction intersecting with a peripheral direction; and
   a reflective part that reflects the light of the image on the display in a direction along the surface of the dial at an edge of the decorative part in the width direction.

5. The display apparatus according to claim 1, wherein the controller controls an adjustment such that a color and brightness of an area corresponding to a boundary with the decorative part in the image on the display match a color and brightness of light after the image on the display is transmitted through the decorative part.

6. The display apparatus according to claim 1, wherein the controller controls an adjustment such that a color and brightness of an area corresponding to a boundary with the decorative part in an image on the display are gradated from a color and brightness of an area corresponding to the decorative part to a color and brightness of an unformed area in which the decorative part is not arranged.

* * * * *